Nov. 6, 1962  D. W. MOLINS ETAL  3,062,588
APPARATUS FOR FEEDING STUBS
Filed March 31, 1960  6 Sheets-Sheet 1

INVENTORS
Desmond W. Molins
Tom Rowlands
Jan A. Rakowicz
BY
Watson, Cole, Grindle & Watson
ATTORNEYS

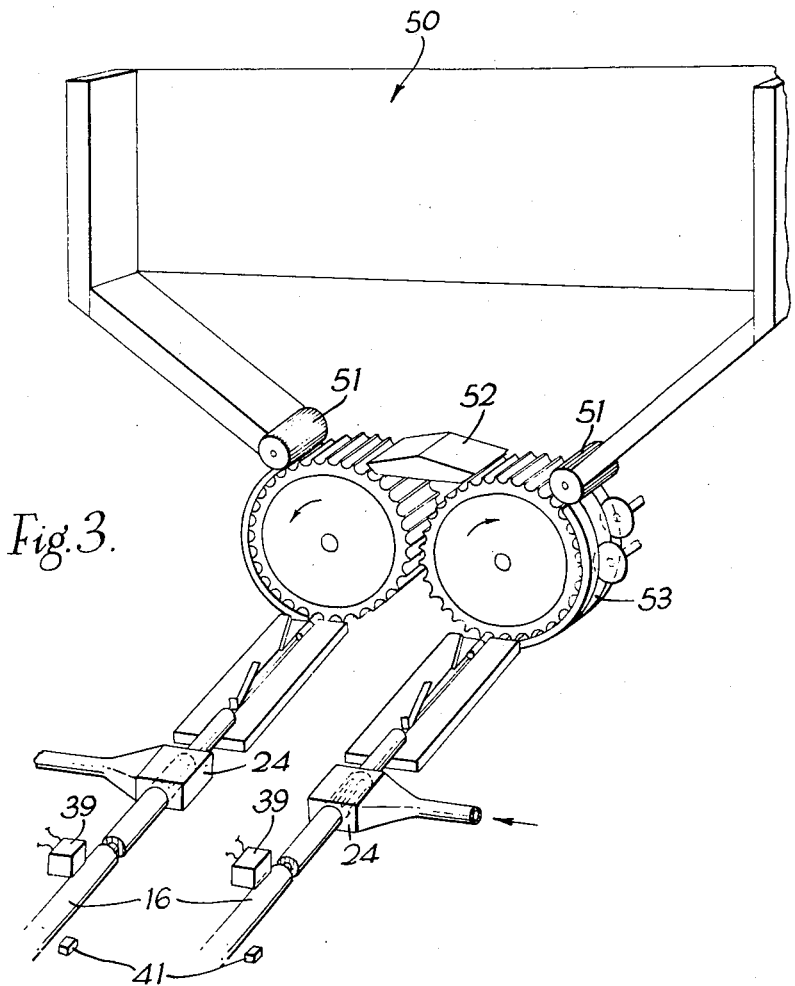

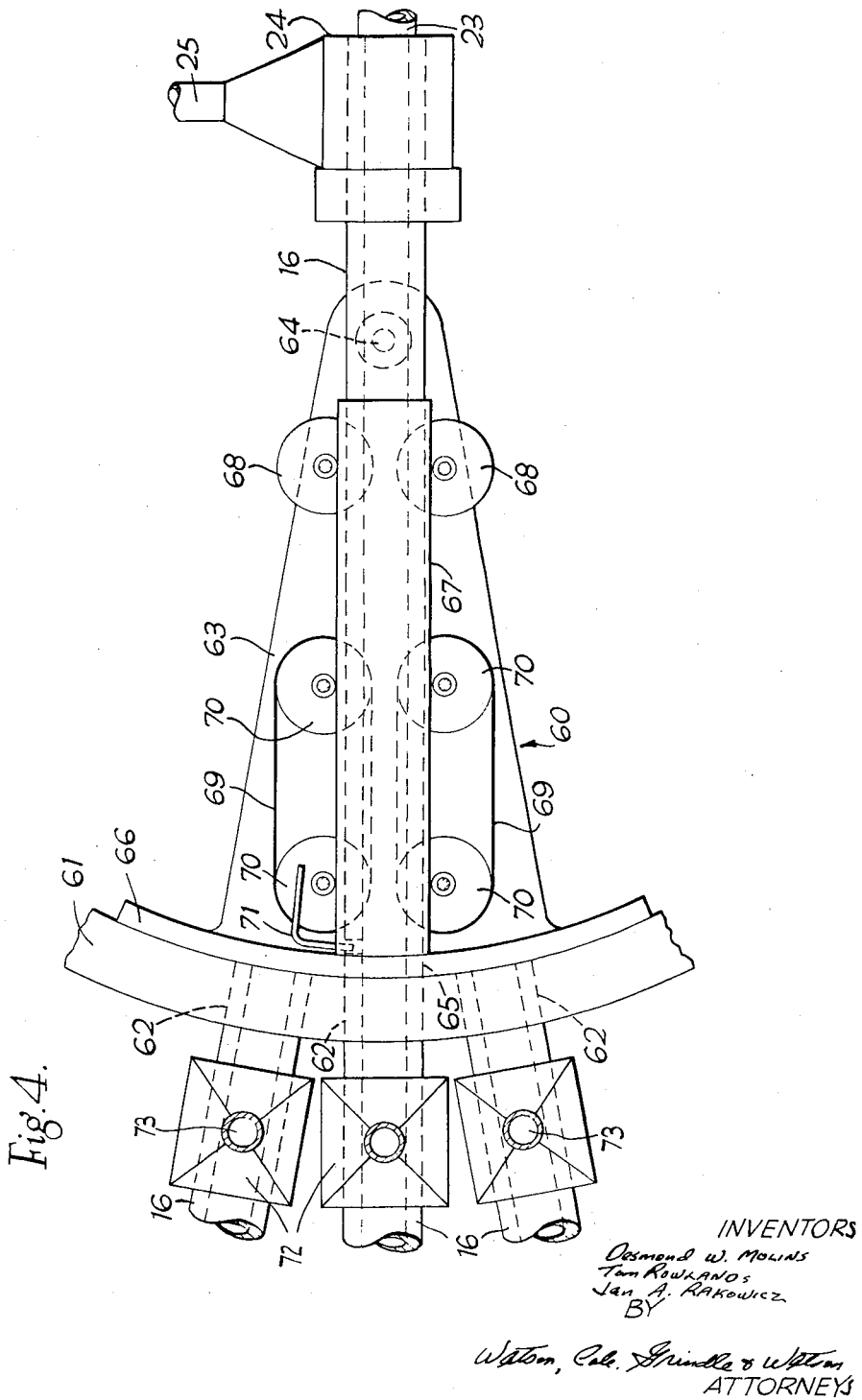

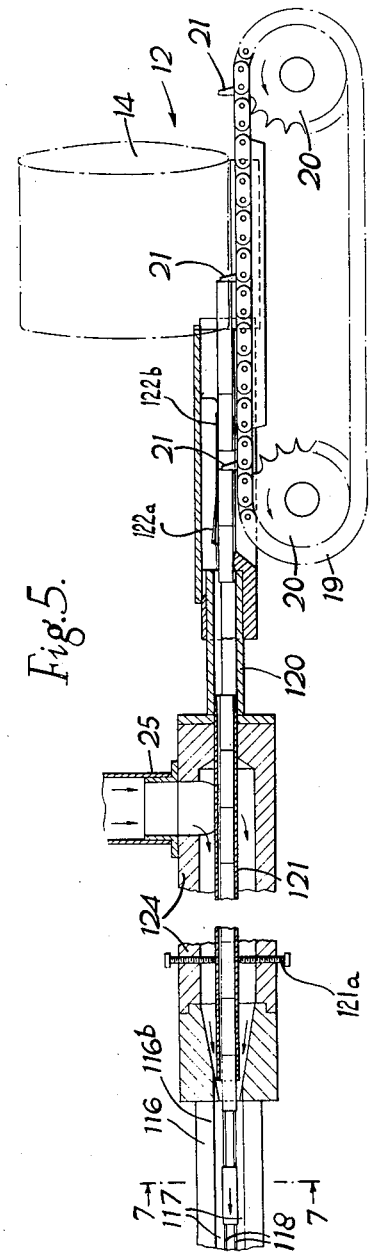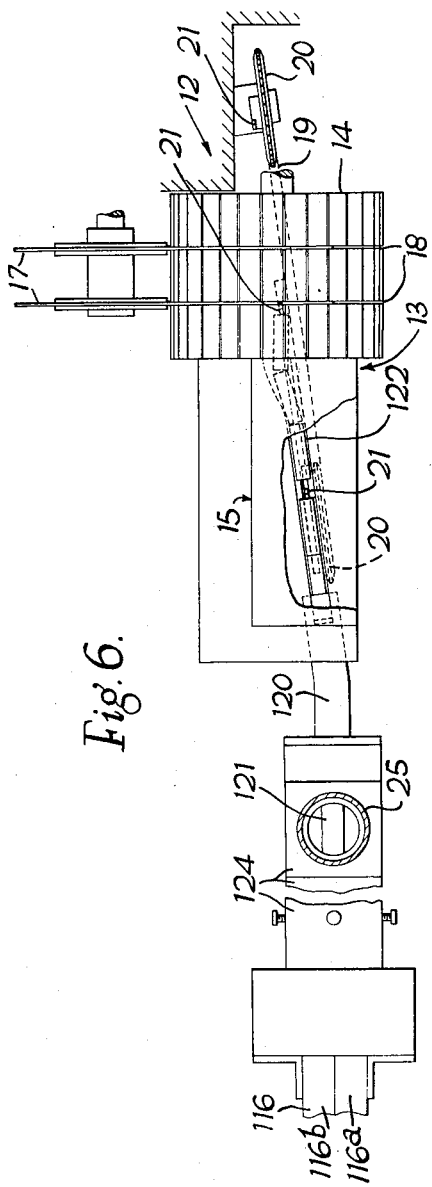

Nov. 6, 1962   D. W. MOLINS ETAL   3,062,588
APPARATUS FOR FEEDING STUBS
Filed March 31, 1960   6 Sheets-Sheet 5
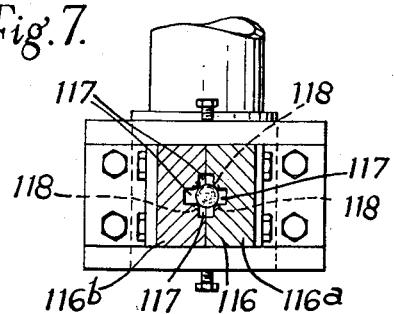
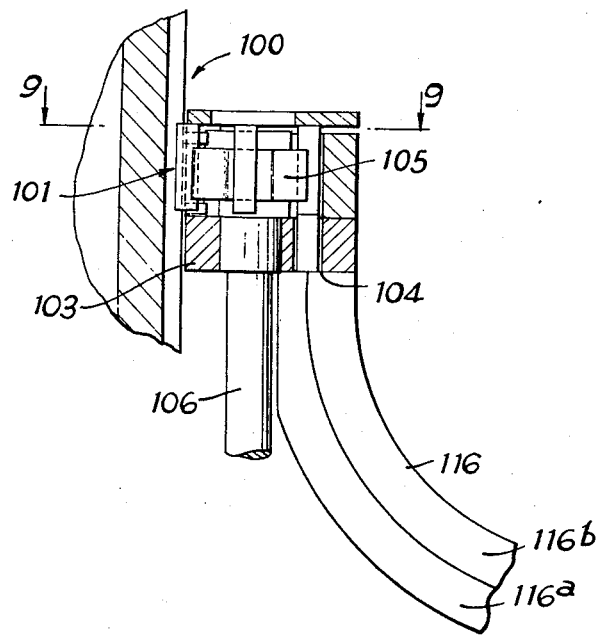
INVENTORS
Desmond W. Molins
Tom Rowlands
Jan A. Rakowicz
BY
Watson, Cole, Grindle & Watson
ATTORNEYS Nov. 6, 1962  D. W. MOLINS ETAL  3,062,588
APPARATUS FOR FEEDING STUBS
Filed March 31, 1960  6 Sheets—Sheet 6
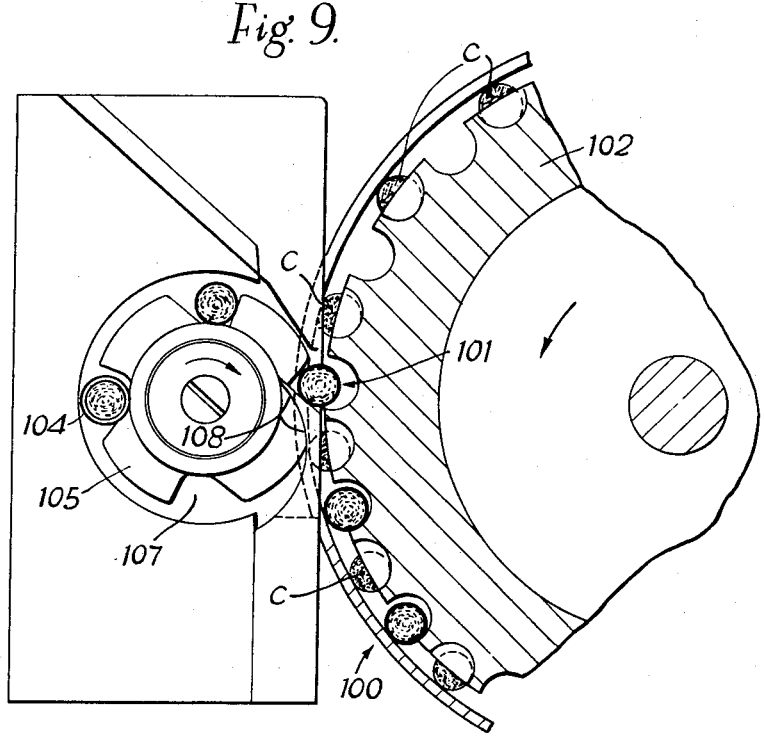
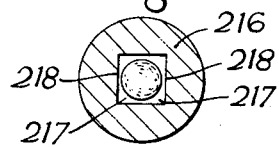
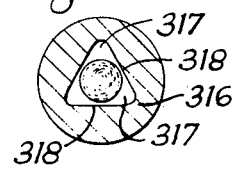
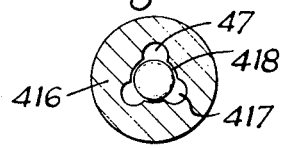
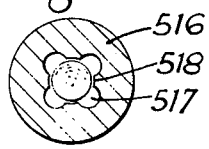
INVENTORS
Desmond W. Molins
Tom Rowlands
Jan A. Rakowicz
BY
Watson, Cole, Grindle & Watson
ATTORNEYS United States Patent Office 3,062,588
Patented Nov. 6, 1962

3,062,588
APPARATUS FOR FEEDING STUBS
Desmond Walter Molins, Tom Rowlands, and Jan Antoni Rakowicz, London, England, assignors to Molins Machine Company Limited, London, England, a British company
Filed Mar. 31, 1960, Ser. No. 18,958
Claims priority, application Great Britain Apr. 2, 1959
24 Claims. (Cl. 302—2)

This invention relates to stub-feeding apparatus for feeding stubs to a work station on an automatic machine or for feeding stubs to a plurality of such work stations. The automatic machine may, for example, be a machine for assembling cigarettes and stubs.

In the present specification the word "stub" is intended to include any sort of mouthpiece portion for a cigarette (such as a piece of filtering material or a hollow tube or any other suitable piece of material (including tobacco) which is different from the tobacco contained in the rest of the cigarette or any combination of the foregoing) whether the length of the stub is the length required in a finished cigarette or a multiple of such length.

In the manufacture of cigarettes it is common practice with continuous rod cigarette-making machines to sever the continuous cigarette rod into cigarette lengths, to separate the severed lengths and insert in each alternate space a double-length stub which is then united with the cigarette length on either side of it and severed at its midpoint to produce two mouthpiece cigarettes. To introduce the stubs into the severed cigarette rod the cigarette-making machine is equipped with apparatus known as a stub assembler and a hopper containing a supply of stubs which are fed to the stub-assembler. Such stub hoppers are bulky and take up valuable room on the cigarette-making machine and, as the hoppers have to be continually refilled, access must be provided to each hopper which may necessitate the machines being spaced further apart than would otherwise be necessary.

According to the present invention there is provided a stub-feeding apparatus for feeding stubs to a work station on an automatic machine (e.g. a work station on an automatic machine for assembling cigarettes and stubs) comprising a stub hopper having abstractor means for abstracting stubs from the hopper, said abstractor means being capable of abstracting stubs at a rate at least as great as the rate of consumption at the work station and having driving means, and guide means extending between the hopper and the work station and adapted and arranged to receive stubs abstracted from the hopper and to guide them to the work station.

Further according to the present invention there is provided a sub-feeding apparatus for feeding stubs to a plurality of work stations each on an automatic machine (e.g. a machine for assembling cigarettes and stubs) comprising a stub hopper having abstractor means for abstracting stubs from the hopper, said abstractor means being capable of abstracting stubs at a rate at least as great as the total of the rates of consumption at the work stations and having driving means, and an equal plurality of guide means each extending between the abstractor means and a work station and adapted and arranged to receive stubs abstracted from the hopper and guide them to the work station.

The stub hopper may be located remotely from the automatic machine and the driving means for the abstractor means may be independent of the driving means for the automatic machine.

The stub-feeding apparatus may comprise control means operable to cause the driving means to operate the abstractor means to feed stubs in accordance with the rate of consumption by the automatic machine or machines.

The guide means may be dimensioned internally laterally to the direction of feed to constrain the stubs in end-to-end relation and the stubs may be urged along the guide means by a flow of air therethrough.

The guide means may be shaped internally to provide at least three guide surfaces equally spaced around the periphery of the stub guide means to define a path for the stub, channels extending longitudinally of the guide means being provided between the guide surfaces for the passage of air past the stubs and in contact therewith.

The internal cross-section of the guide means may be generally cruciform, the channels being constituted by the arms of the cross, and the guide surfaces by the junctions between the arms, or may be a regular polygon (e.g. a square or an equilateral triangle), the channels being constituted by the corners between the sides, and the guide surfaces by the mid portions of the sides, or may be of generally clover leaf form, the channels being constituted by the lobes, and the guide surfaces by the portions between the lobes.

Conveniently the guide means comprises flexible tube and may be formed e.g. by extrusion from a transparent material (e.g. polythene).

Lateral-displacement means may be provided at the end of the guide means adjacent the work station to displace each stub laterally with respect to the succeeding stub for its rear face to be engaged by a pusher and the lateral-displacement means may take the form of an inclined portion extending lengthwise of the guide means leading to a channel along which the pusher urges the stub.

The abstractor means may comprise carrier means having channels in side-by-side relation to receive stubs and convey them to feeding means to be supplied in end-to-end relation into the adjacent end of the guide means.

The guide means may be connected to a breech into which the stubs are fed and in which the stubs are an easy sliding fit and air under pressure may be supplied to the end of the guide means adjacent the breech to urge each stub to abut the preceding stub in the guide means as it moves from the breech.

The air for urging the stubs along the guide means may be introduced into the guide means by means of a muff which encircles a guide tube into one end of which the stubs are fed, the muff at this end of the guide tube sealing therewith, and at its other end having an outlet for the stubs and air which is connected to the guide means, the guide tube terminating short of the outlet so that air passing from the muff into the guide means tends to draw into the guide means the foremost stub protruding from the guide tube.

Adjustment means may be provided for laterally adjusting the position of the outlet of the guide tube relative to the outlet of the muff and the inlet to the guide means e.g. the guide tube may be supported adjacent its outlet end by screws threaded through the wall of the muff.

The control means may be operable to cause the driving means to operate the abstractor means intermittently and at a higher instantaneous rate of feed of stubs than the rate of consumption at the work station or work stations.

The abstractor means may comprise the same number of carrier means and feeding means as there are guide means, or a single carrier means and a single feeding means may be provided which feeds the stubs to a selector means to selectively supply a plurality of guide means. Such a selector means may comprise a stationary manifold having a plurality of ports each leading to a guide means and a movable portion cooperating with the manifold and having a single port to which the feeding means supplies stubs, the movable portion being arranged for movement relative to the manifold to bring the port in the movable portion into line selectively with any port in the manifold to allow passage of stubs from the feeding means into the associated guide means, the movable portion having blanking means to blank off the ports in the manifold not aligned with the port in the movable portion.

Where the abstractor means comprises the same number of carrier means and feeding means as there are guide means, detection means may be provided to detect two predetermined quantities of stubs in the guide means and operative on detection of the larger of said two quantities to actuate the control means to stop the abstractor means and vice versa on detection of said smaller quantity of stubs.

Where the abstractor means comprises a single carrier means and a single feeding means which feeds the stubs to a selector means which selectively supplies a plurality of guide means detection means may be provided to detect two predetermined quantities of stubs in each guide means and operative on detection of the larger of said two quantities of stubs in one guide means and the smaller of said two quantities of stubs in another guide means to actuate the control means to operate the selector means to stop feeding stubs into said one guide means and to commence feeding stubs into said other guide means, said detection means further being operative on detecting the larger quantity of stubs in one guide means and not detecting the smaller quantity of stubs in another guide means to actuate the control means to stop the extractor means and actuate the control means to restart the extractor means and operate the selector means to feed stubs into a guide means when the smaller of said two quantities of stubs is detected in that guide means.

The detection means may comprise first and second photo-electric cells each with an associated light source, each photo-electric cell and its associated light source being arranged on opposite sides of the guide means, the first and second photo-electric cells being spaced from the work station and spaced apart such that the lengths of the guide means from the work station to the first and second photo-electric cells are dimensioned to hold respectively the smaller and larger quantities of stubs.

The detection means may be arranged so that the feeding of stubs into the guide means is stopped when passage of light to the second photo-electric cell from its associated light source is interrupted by a stationary stub therebetween and the feeding of stubs into the guide means is started when passage of light to the first photo-electric cell from its asosciated light source is not interrupted by a stationary stub therebetween.

Four embodiments of stub-feeding apparatus made and operating in accordance with the present invention will now be described, by way of example, with reference to the accompanying drawings, of which:

FIGURE 3 is a perspective view of part of a second embodiment;

FIGURE 4 is a plan view of part of a third embodiment;

FIGURE 5 is a side elevation of part of a fourth embodiment of the apparatus;

FIGURE 6 is a plan view corresponding to FIGURE 5;

FIGURE 7 is a sectional view of the guide means taken on line 7—7 of FIGURE 5,

FIGURE 8 is a plan view showing the means by which stubs are transferred from the guide means to a stub assembler;

FIGURE 9 is a view on the line 9—9 of FIGURE 8, and

FIGURES 10, 11, 12 and 13 illustrate some alternative cross-sections of the guide means.

Figure 1:
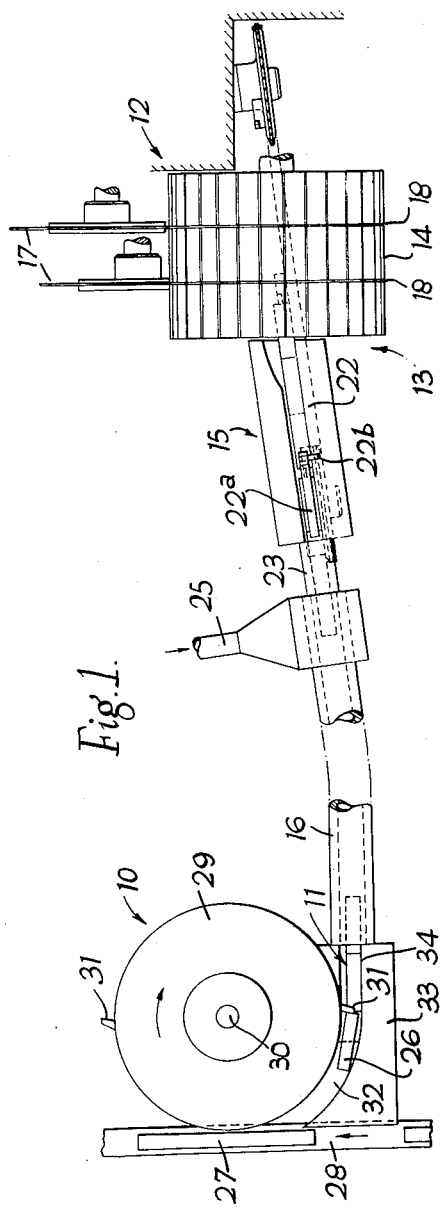
FIGURE 1 is a plan view of the first embodiment.
Figure 2:
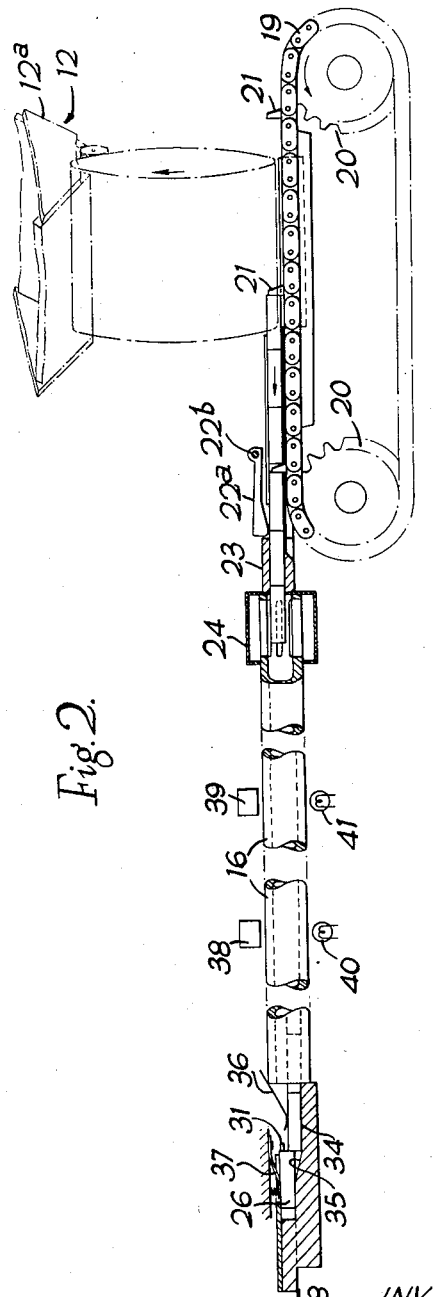
FIGURE 2 is a side elevation of the apparatus shown in FIGURE 1.

In FIGURES 1 and 2 an automatic machine for assembling cigarettes and stubs is shown at 10 and will be hereinafter referred to as a stub assembler. A work station is located at 11 on the stub-assembler 10 and a stub-feeding apparatus for feeding stubs to the work station 11 comprises a stub hopper 12 with a stub container 12a (the stub container 12a is not shown in FIGURE 1) which has abstractor means 13 including a carrier means in the form of a rotatable fluted drum 14 and feeding means 15 for conveying stubs to one end of a guide means 16 which extends to the work station 11 on the stub-assembler 10.

The hopper 12 contains sextuple length stubs which are received in the flutes of fluted drum 14 and are carried in side-by-side relation past two rotating cutters 17 which project into grooves 18 in the fluted drum 14 and sever each sextuple length stub into three double-length stubs in end-to-end relation.

Below the fluted drum 14 is arranged a feeding means comprising an endless chain 19 which passes around two sprockets 20 and is driven in the direction shown by the arrow. The chain 19 has projecting from one side of it upstanding fingers 21 which are spaced apart the length of three double-length stubs. The fingers 21 are arranged to pass through the lowermost flute of the drum 14 and remove the stubs therein. The chain 19 is arranged at such an angle to the lowermost flute that the amount the drum rotates in the time taken by a finger 21 to pass through a flute is equal to the amount the finger 21 moves transversely. The fingers 21 protrude through an open-topped channel 22 through which the stubs are urged and which leads to a breech 23 into which the stubs are urged and in which they are an easy sliding fit. Just before the entry to the breech 23 is arranged a non-return flap 22a pivotally mounted at 22b whose function will be referred to later.

The breech 23 leads to the guide means 16 formed as a length of transparent, flexible polythene tube having an inside diameter greater than the diameter of a stub but less than the length of a stub so that the stubs are constrained in end-to-end relation. At the junction of the guide means 16 with the breech 23 is arranged a muff 24 which is arranged to be supplied with air under pressure through a pipe 25.

The hopper 12 is arranged at any convenient position remote from the work station 11 and the length of the guide means 16 is chosen so that an easy path free from sharp turns is provided. Thus, a number of such hoppers 12 may be arranged closely together to facilitate replenishing them with stubs whilst the work stations 11 which they supply may be either close together or spaced far apart, as convenient.

As previously mentioned, the work station 11 to which the stubs are to be fed is located on a stub assembler 10. The stub assembler 10 operates by feeding a double-length stub 26 into each alternate gap between a line of separated cigarette lengths 27. The severing of the cigarette rod into cigarette lengths 27 and the separation of such lengths is carried out in any convenient manner, and the separated lengths 27 are carried on a travelling conveyor tape 28 through the stub assembler 10 in the direction shown by the arrow. The stub assembler 10 comprises a rotatable disc 29 arranged with its driving spindle 30 vertical and having on its periphery at diametrically spaced points two pushers 31. During operation, each pusher 31 in turn enters a curved channel 32 formed in a member 33 and engages the rear end of the foremost stub 26 and urges it along the channel 32 into the gap between two cigarette lengths 27. The cigarette lengths and the intervening stub are later abutted and united and the stub is severed to produce two mouthpiece cigarettes.

The guide means 16 terminates at the entry to a straight channel 34 formed in the member 33 and an incline 35 is provided where this straight channel 34 merges into the curved channel 32. A light spring 36 is provided above the straight channel 34 to control the stubs passing therethrough and a stronger spring 37 is provided just after the incline 35 to turn the stub into the horizontal position after it has ascended the incline 35 by being pushed forward by the succeeding stub which is under the light spring 36. By this means the rear face of the foremost stub is brought into the path of a pusher 31 and the succeeding stub is held down out of the path of the pusher by the light spring 36.

Detection means comprising two photo-electric cells 38, 39 each with an associated light source 40, 41 are provided to detect two predetermined quantities of stubs in the guide means 16. The two photo-electric cells 38, 39 are arranged on one side of the transparent guide means 16 and the associated light sources 40, 41 are arranged on the other side. The photo-electric cell 38 and its associated light source 40 are spaced from the work station 11 and the photo-electric cell 39 and its associated light source 41 are spaced further from the work station 11. The photo-electric cells 38, 39 are arranged to actuate control means (not shown) in a manner to be described later.

The apparatus operates in the following manner. As the fluted drum 14 rotates each of its flutes receives a sextuple length stub and each stub passes under the rotating cutters 17 to be severed into three double-length stubs as the flute containing it moves downwards. When each flute reaches its lowermost position a finger 21 enters its right-hand end and pushes the three stubs contained therein into the open-topped channel 22 and thence into the breech 23. As each finger moves downwards around the left-hand sprocket 20 and away from the stubs the gap between stubs previously occupied by the finger is closed up and the stubs continue to be pushed forward by the three succeeding stubs still being pushed by a finger. As each stub emerges from the breech 23 into the polythene tube 16 it comes under the influence of the flow of air from the muff 24 and is blown through the tubing until it abuts the preceding stub since the air cannot flow through the breech 23 as this is continually blocked by a stub which is a good fit therein and these stubs are positively urged forward by a finger 21.

It is arranged that the rate at which stubs are fed into the tube 16 is greater than the rate of consumption of the stubs at the work station 11 and thus a line of stubs builds up in the tube 16 at the end adjacent the work station 11 until the rear stub obturates passage of light from the light source 41 to the photo-electric cell 39. It is arranged that the cessation of current from the photo-electric cell 39 operates control means of conventional kind to stop rotation of the fluted drum 14 and movement of the chain 19. When sufficient stubs have been consumed at the work station 11 to bring the last stub in the line of stubs in the tube 16 past the photo-electric cell 38 so that passage of light to this cell from the light source 40 is not obturated, the flow of current from this cell is arranged to operate the control means to recommence feeding of stubs into the tube 16 by recommencing rotation of the fluted drum 14 and movement of the chain 19. This sequence of events is continuously repeated whilst the apparatus is in operation. It will be appreciated that the flow of air through the tube 16 ensures that the line of stubs leading to the work station 11 are in abutment and move forward as each foremost stub is engaged by a pusher 31 in the stub-assembler 10 and urged along the curved channel 32. The next stub is then pushed up the incline 35 by the flow of air around the stubs in the tube 16 but cannot move forward in the curved channel until it is engaged by the other pusher because the succeeding stub is held at the foot of the incline 35 by the light spring 36. Should the supply of stubs in the hopper 12 become exhausted the non-return flap 22a will drop down below the last stub as it enters the breech 23 and thus prevent this last stub being blown back by the flow of air from the muff 24.

In the second embodiment of stub-feeding apparatus shown in FIGURE 3 the same numerals are used for parts which are similar to those shown in FIGURES 1 and 2.

In this embodiment, the hopper 50 is generally similar in construction to the hopper 12 in FIGURES 1 and 2 with the exception that two abstractor means each comprising a carrier means in the form of a fluted drum 14 are provided. At each side of the base of the aperture in the hopper a brushing roller 51 is provided which rotates in the opposite direction to the adjacent fluted drum 14 to brush back surplus stubs. A peaked bridge piece 52 is provided above the fluted drums 14 to feed stubs smoothly into the flutes. A pair of rotating cutters 17 for each fluted drum 14 is again provided and also a curved guide piece 53 is provided around part of each drum 14 to prevent stubs falling out of the flutes. Beneath each fluted drum 14 is situated a feeding means as described with reference to FIGURES 1 and 2 and similarly each feeding means leads to breech 23 which in turn leads to a guide means 16 in the form of a flexible polythene tube. A muff 24 for the supply of air is provided adjacent each breech 23. Similar detection means in the form of the two photo-electric cells and associated light sources are provided but only the cell 39 and the light source 41 for each guide means is shown. The drive means for one fluted drum 14 and chain 19 is independent of the drive means for the othr fluted drum 14 and chain 19 and independent also of the drive means for the automatic machines which are supplied with stubs. Thus each guide means 16 leads to a work station on an automatic machine such as a stub assembler as shown in FIGURES 1 and 2 which operate independently of each other.

As the rates of consumption of stubs at the two automatic machines may be different and also the rates at which the two abstractor means remove stubs from their associated carrier means may be different each detection means will operate to stop and start its associated abstractor means at times completely independent of each other.

This embodiment, of course, has the advantage that only one hopper in place of two has to be attended to and replenished. If desired, more than two work stations on automatic machines could be fed from one hopper. Thus more than two fluted drums 14 could be provided each with an abstractor means comprising a carrier means such as a fluted drum 14 leading to a feeding means and guide means 16.

In FIGURE 4 there is illustrated a third embodiment of stub-feeding apparatus.

In this embodiment a single abstractor means is provided which feeds stubs to a plurality of guide means by means of a selector means. The hopper, abstractor means and breech are not shown but are arranged as in FIGURES 1 and 2 and the right-hand end of FIGURE 4 commences between the breech 23 and the muff 24 as shown in FIGURES 1 and 2 and from the right-hand end of FIGURE 4 the apparatus is as shown at the right-hand end of FIGURES 1 and 2. Once again like numerals will be used for parts common to both embodiments.

In this embodiment the guide means 16 leads to a selector means 60 which comprises a stationary manifold 61 having three ports 62, each of which leads to a guide means 16, and a movable portion 63 which is pivotally mounted at 64 and has a single port 65. The movable portion 63 can be adjusted to bring the single port 65 into line selectively with any of ports 62 and has blanking means 66 which blank off the other ports 62 not in line with the single port 65 at any one time.

The single guide means 16 leads to the single port 65 and is secured to the movable portion 63 of the selector means 60 by a cover plate 67. Protruding through apertures in the cover plate 67 and guide means 16 is a pair of rollers 68 and two endless bands 69 which each pass around and are driven by a pair of rollers 70. The rollers 68 and bands 69 are spaced apart a sufficient distance to enable them to grip a stub. The pair of rollers 68 are arranged to be driven at a peripheral speed approximately equal to the rate of feed of stubs along the single guide means 16 so that when the abstractor means is operating a line of stubs is pushed towards the endless bands 69. It is arranged that the adjacent runs of the bands 69 move in the direction of feed of the stubs and at a higher speed than that at which the line of stubs is pushed by the rollers 68 towards them. Thus, as the leading stub of a line of stubs has its leading end gripped between the bands 69 it is drawn forwards away from the next stub in the line at a greater speed than that next stub is advancing towards the bands 69. That next stub now becomes the leading stub and has its leading end gripped between the bands 69 and the process is repeated. Thus the stubs pass between the bands 69 with gaps between them so that a shutter member 71 can be moved into a gap between two stubs to stop passage of stubs through the port 65 when it is required to move the movable portion 63 so that port 65 will come into line with another port 62 whereupon the shutter 71 will be retracted. The frictional grip between the bands 69 and a stub or stubs between them is arranged so that slippage can occur when passage of stubs is prevented by the shutter 71 without damage being caused to the stubs. Each of the three guide means 16 leading to a port 62 in the stationary part 61 of the manifold has a muff 72 around it similar to the muffs 24 and these muffs 72 are supplied with air under pressure through pipes 73. Each of the three guide means 16 is provided with a detection means comprising two photo-electric cells and two light sources as in FIGURES 1 and 2 and the detection means are arranged to operate a control means (not shown) which controls the abstractor means. Each guide means 16 leads to a work station on an automatic machine such as stub assemblers similar to stub assembler 10 in FIGURES 1 and 2.

The operation of the apparatus is as follows. When the abstractor means is operating it feeds stubs to the breech 23. These stubs are urged along the single guide means 16 by the flow of air through the muff 24 and pass between the rollers 68 which feed a line of stubs to between the bands 69. As described above, the bands 69 separate and feed the stubs onwards through the port 65 and the stubs then pass through the aligned port 62. The passage of the stubs thus far will be assisted by the flow of air from the muff 24. As each stub passes through the muff 72 it is blown along the guide means until it abuts the last stub in the line of stubs in the guide means leading to the work station. When this line of stubs reaches to the photo-electric cell 39 and obturates passage of light from source 41 to this cell the cessation of current operates the control means to insert the shutter 71 and so stop passage of stubs through the port 65 and aligned port 62. If in one of the other guide means 16 there is not a line of stubs leading to its associated work station and of sufficient length for it to obturate passage of light from light source 40 to photo-electric cell 38 the current from this cell operates the control means to move the movable portion of the selector means to bring port 65 into line with the associated port 62 whereupon shutter 71 is retracted by the control means and stubs are fed into that guide means until the rear end of the line of stubs in that guide means obturates light from the source 41 to the cell 39 whereupon shutter 71 is again inserted. If the line of stubs in one of the other two guide means is not long enough to obturate light from the source 40 to the cell 38 the sequence of events as just described will be repeated. If however, this is not the case, i.e. in each of the three guide means there is a line of stubs leading to the associated work-station which is long enough to obturate light from the source 40 to the cell 38 then the control means will stop the driving means for the fluted drum 14 and chain 19 of the abstractor means until in one of the guide means the line of stubs advances far enough towards the associated work station for light to pass from the light source 40 to the cell 38. When this happens the control means will recommence driving the abstractor means and the movable portion 63 of the selector 60 will be adjusted to bring the port 65 into line with the port 62 leading to the guide means requiring supply of stubs as indicated, the shutter 71 will be retracted and feeding of stubs through the aligned ports 62 and 65 will commence.

Referring now to FIGURES 5 to 9, the apparatus is basically similar to that disclosed in FIGURES 1 and 2 and like numerals will be used where possible.

Part of an automatic machine for assembling cigarettes and stubs is shown at 100 in FIGURES 8 and 9 and will be referred to as a stub assembler. A work station is located at 101 on the stub assembler 100 and in FIGURES 5 and 6 there is shown apparatus for feeding stubs to the work station 101 comprising a stub hopper 12 as in FIGURES 1 and 2 (the actual container for the stubs not being shown) which has abstractor means 13 including a carrier means in the form of a rotatable fluted drum 14 and feeding means 15 for conveying stubs to one end of a guide means 116 which extends to the work station 101. The hopper 12 and the abstractor means 13 are as shown in FIGURES 1 and 2.

The fingers 21 protrude through an open-topped channel 122 through which they urge the stubs, and which leads to a tube 120 in which the stubs have a clearance, and which in turn leads to a guide tube 121 in which the stubs have a small clearance. The wall of the guide tube 121 tapers in thickness at its right hand end to provide an easy entry for stubs, and at its outlet (left-hand end) the guide tube terminates short (approximately a distance equal to a single length stub) of the guide means 116. A non-return spring 122a is secured at 122b and is provided to spring down behind the last stub if the hopper 12 should be emptied and prevent this stub being blown back.

The guide means 116 is formed of a transparent plastic material in two halves 116a and 116b and has a substantially cruciform internal cross-section as shown in FIGURE 7. Referring to FIGURES 5 and 7, a stub is shown in the guide means 116. Four channels 117 constituted by the arms of the cross are formed around the stub and extend longitudinally of the guide means, and between the channels 117 are four guide surfaces 118 which also extend longitudinally and define a path for the stub and are spaced from each other so that the stub slides easily between them.

A muff 124 is arranged to encircle the guide tube 121 and at its right hand end seals therewith and is secured to the tube 120. At its left hand end the muff 124 is secured to the inlet end of the guide means. The muff 124 is supplied with air under pressure through a pipe 25. The guide tube 121 is supported near its left hand end by two screws 121a which are threaded through the wall of the muff and allow the guide tube 121 to be aligned accurately with the guide means 116.

The hopper may be located at any convenient position remote from the work station 101 on the stub assembler 100.

The stub assembler operates by inserting a double length stub into a gap between two cigarette lengths. In FIGURE 9 there is shown a portion of a fluted drum 102 which contains cigarette lengths C in alternate flutes. At the work station 101 a stub from the guide means 116 is transferred into each flute between those containing the cigarette lengths C.

The guide means 116 terminates (FIGURES 8 and 9) at a plate 103 which contains an aperture 104 slightly larger than a stub. A four lobed rotor 105 is journalled in the plate 103 and has a driving shaft 106. As a channel 107 in the rotor 105 comes opposite the aperture 104 the foremost stub which will be held against the side face of the lobe by air flowing from the guide means 116 through the aperture 104 will move into the channel 107 and will be transferred into a flute of the drum 102. A stripper 108 is provided to ensure that the stub is not carried past the flute.

The apparatus described operates in the following manner. The hopper 12 and the abstractor means 13 operate as in FIGURES 1 and 2. As the fluted drum 14 rotates each of its flutes receives a sextuple length stub from the hopper container which is severed into three double-length stubs as the flute moves downwards under the rotating cutters 17. When each flute reaches its lowermost position a finger 21 moves through the flute from right to left and pushes the three stubs therein into the open topped channel 122, thence into the tube 120 and thence into the guide tube 121. As each finger moves downwards around the left hand sprocket 20 and away from the stubs the gap between stubs previously occupied by the finger is closed up as the suceeding three stubs are pushed forward by the succeeding finger 21. As each stub emerges from the end of the guide tube 121 the flow of air from the muff 124 into the channels 117 assists in drawing the stub out of the guide tube 121 by means of an injector action, and when the stub is in the guide means 116 it is urged along by the air flowing through the channels 117 past the stub. Thus, so long as stubs are fed into the guide tube 121 they will be carried along the guide means 116 towards the aperture 104 and a line of abutting stubs will be formed at the other end of the guide means 116.

The foremost stub will move forward into the first vacant channel 107 in the rotor 105 as the rotor rotates and will then be carried around and transferred into the first vacant flute in the drum 102.

The rate at which stubs are abstracted from the fluted drum 14 may be greater than that at which they are transferred to the fluted drum 102 and detection means such as those shown in FIGURES 1 and 2 and described above may be employed to stop the drum 14 and the chain 19 when a certain number of stubs are present at the outlet of the guide means 116 and to start the drum 14 and chain 19 again when a certain smaller number of stubs are present at the outlet of the guide means 116.

Also, if desired, the present embodiment could be modified to produce arrangements such as those shown in FIGURES 3 and 4.

In FIGURE 10 there is shown a guide means 216 which is alternative to the guide means 116. The internal cross-section is a regular polygon, a square, and guide surfaces 218 are provided by the mid portions of the four sides and channels 217 are constituted by the corners between the sides.

In FIGURE 11 is a further alternative form of guide means 316, again having an internal cross-section as a regular polygon, in this case an equilateral triangle. Again the guide surfaces 318 are formed by the mid portions of the sides and the channels 317 by the corners between the sides.

In the guide means 416 shown in FIGURE 12 the internal cross-section is of clover leaf form, the channels 417 being formed by the lobes and the guide surfaces 418 between the lobes.

Similarly in FIGURE 13, the guide means 516 has an internal cross-section of clover leaf form, but in this case there are four lobes forming channels 517 and four guide surfaces 518.

The guide means 216, 316, 416 and 516 of FIGURES 10, 11, 12 and 13 respectively may be made of transparent polythene and extruded as a tube. The guide means 116 could also be extruded as a tube rather than being made in two parts 116a and 116b.

Referring again to FIGURES 6 and 7, the aperture 104 in the plate 103 is smaller in cross-sectional area than the internal cross-section of the guide means 116. Thus the air velocity around the leading stub in the aperture 104 is greater than that around the succeeding stubs, and the drag on this leading stub is also greater. When an empty channel 107 in the rotor 105 comes opposite the leading stub the stub is accelerated away from the succeeding stub. This allows the stub in the channel to be carried by the rotor 105 clear of the succeeding stub, and rubbing of the rear face of the stub in the channel and the leading face of the succeeding stub is avoided, or at least, can be reduced.

The end of the guide means 116 may have its internal cross-section gradually changed adjacent the plate 103 to provide a smooth merging into the aperture 104.

What we claim as our invention and desire to secure by Letters Patent is:

1. In stub feeding mechanism having a stub hopper and abstractor means for removing stubs from the hopper and delivering them in end-to-end relation to be fed to a work station on an automatic machine, apparatus comprising a closed guide conduit extending between the abstractor means and the work station and having an internal width less than the length of the stubs to receive stubs from the abstractor means and guide them in end-to-end relation to the work station, and air supply means connected to said conduit at a location spaced from the work station to supply a flow of air through the conduit to urge the stubs toward the work station, said guide conduit being formed to provide a plurality of peripherally spaced longitudinally extending guide surfaces engaging and defining a path for the stubs and to provide between said guide surfaces a plurality of longitudinally extending channels to permit flow of air past the stubs.

2. Apparatus as claimed in claim 1 wherein the guide conduit has an internal cross-section providing at least three equally spaced guide surfaces to define a path for the stubs, said guide surfaces alternating with channels extending longitudinally of the conduit for the passage of air past the stubs and in contact therewith.

3. Apparatus as claimed in claim 2 wherein the internal cross-section of the guide conduit is a regular polygon, the channels being constituted by the corners between the sides, and the guide surfaces by the mid portions of the sides.

4. Apparatus as claimed in claim 3 wherein the internal cross-section of the conduit is a square.

5. Apparatus as claimed in claim 3 wherein the internal cross-section of the conduit is an equilateral triangle.

6. Apparatus as claimed in claim 2 wherein the internal cross-section of the guide conduit is generally cruciform, the channels being constituted by the arms of the cross, and the guide surfaces by the junctions between the arms.

7. Apparatus as claimed in claim 2 wherein the internal cross-section of the guide means is of generally clover leaf form, the channels being constituted by the lobes, and the guide surfaces by the portions between the lobes.

8. Apparatus as claimed in claim 1 wherein the air supply means comprises a muff and a guide tube is provided extending into the muff, the stubs being fed into one end of the guide tube, the muff at this end of the guide tube sealing therewith, and at its other end having an outlet for the stubs and air which is connected to the guide conduit, the guide tube terminating short of the outlet so that air passing from the muff into the guide conduit tends to draw into the guide conduit the foremost stub protruding from the guide tube.

9. Apparatus as claimed in claim 8 and comprising adjustment means for laterally adjusting the position of the outlet of the guide tube relative to the oulet of the muff and the inlet to the guide means.

10. Apparatus as claimed in claim 1 wherein the guide means comprises flexible tube.

11. Apparatus as claimed in claim 1 wherein the guide conduit is extruded from a transparent material e.g. polythene.

12. Apparatus as claimed in claim 1 and comprising a breech connected to the guide conduit and into which the stubs are fed and in which they are an easy sliding fit, the air supply means being connected to the guide conduit adjacent the breech to urge each stub to abut the preceding stub in the guide conduit as it moves from the breech.

13. Apparatus as claimed in claim 1 and further comprising means defining a surface inclined to the foremost stubs in the guide conduit at the end of the guide conduit adjacent the work station, and a pusher to engage the rear face of the stub displaced by the inclined surface and urge it along means defining a circular channel extending to the work station.

14. Stub feeding apparatus for feeding stubs to a work station on an automatic machine having driving means, said apparatus comprising a stub hopper located remotely from the machine, abstractor means to remove stubs from the hopper and deliver them in end-to-end relation to be fed to the work station, driving means for the abstractor means independent of the driving means for the machine, a closed guide conduit extending between the abstractor means and the work station and having an internal width less than the length of the stubs to receive stubs from the abstractor means and guide them in end-to-end relation to the work station, air supply means connected to the conduit at a location adjacent the abstractor means to supply a flow of air through the conduit to urge the stubs toward the work station, and control means to operate the driving means for the abstractor means to cause the abstractor means to deliver stubs at the average rate of consumption of the automatic machine.

15. Stub-feeding apparatus as claimed in claim 14 wherein the control means is operable to cause the driving means to operate the abstractor means intermittently and at a higher instantaneous rate of feed of stubs than the rate of consumption at the work station.

16. Stub-feeding apparatus as claimed in claim 15 and comprising detection means to detect two predetermined quantities of stubs in the guide conduit and operative on detection of the larger of said two quantities to actuate the control means to stop the abstractor means and vice versa on detection of said smaller quantity of stubs.

17. Stub-feeding apparatus as claimed in claim 16 wherein the guide conduit is transparent and the detection means comprises first and second photo-electric cells each with an associated light source, each photo-electric cell and its associated light source being arranged on opposite sides of the guide conduit, the first and second photo-electric cells being spaced from the work station and spaced apart such that the lengths of the guide conduit from the work station to the first and second photo-electric cells are dimensioned to hold respectively the smaller and larger quantities of stubs.

18. Stub-feeding apparatus as claimed in claim 17 wherein the detection means is arranged so that the feeding of stubs into the guide conduit is stopped when passage of light to the second photo-electric cell from its associated light source is interrupted by a stationary stub therebetween and the feeding of stubs into the guide conduit is started when passage of light to the first photo-electric cell from its associated light source is not interrupted by a stationary stub therebetween.

19. Stub feeding apparatus for feeding stubs to a plurality of work stations each on an automatic machine having driving means, said apparatus comprising a stub hopper located remotely from the machines, abstractor means to remove stubs from the hopper and deliver them in end-to-end relation to be fed to the work stations, driving means for the abstractor means independent of the driving means for the machines, a closed guide conduit extending between each work station and the abstractor means and having an internal width less than the length of the stubs to receive stubs from the abstractor means and guide them in end-to-end relation to the work station, air supply means connected to the conduits at a location adjacent the abstractor means to supply a flow of air through each conduit to urge the stubs toward the work station, and control means to operate the driving means for the abstractor means to deliver stubs at the total average rate of consumption of the automatic machines.

20. Stub feeding apparatus as claimed in claim 19 wherein the control means is operable to cause the driving means to operate the abstractor means intermittently and at a higher instantaneous rate of feed of stubs than the total rate of consumption at the work stations.

21. Stub-feeding apparatus as claimed in claim 20 and further comprising a selector means, the selector means comprising a stationary manifold having a plurality of ports each leading to a guide conduit and a movable portion cooperating with the manifold and having a single port to which the abstractor means delivers stubs, the movable portion being arranged for movement relative to the manifold to bring the port in the movable portion into line selectively with any port in the manifold to allow passage of stubs from the abstractor means into the associated guide conduit, the movable portion having blanking means to blank off the ports in the manifold not aligned with the port in the movable portion.

22. Stub-feeding apparatus as claimed in claim 21 and comprising detection means to detect two predetermined quantities of stubs in each guide conduit and operative on detection of the larger of said two quantities of stubs in one guide conduit and the smaller of said two quantities of stubs in another guide conduit to actuate the control means to operate the selector means to stop feeding stubs into said one guide conduit and to commence feeding stubs into said other guide conduit, said detection means further being operative on detecting the larger quantity of stubs in one guide conduit and not detecting the smaller quantity of stubs in another guide conduit to actuate the control means to stop the abstractor means and actuate the control means to restart the extractor means and operate the selector means to feed stubs into a guide conduit when the smaller of said two quantities of stubs is detected in that guide conduit.

23. Stub feeding apparatus as claimed in claim 22 wherein the guide conduits are transparent and the detection means comprises first and second photo-electric cells for each guide conduit each with an associated light source, each photo-electric cell and its associated light source being arranged on opposite sides of the guide conduit, the first and second photo-electric cells being spaced from the work station and spaced apart such that the lengths of the guide conduit from the work station to the first and second photo-electric cells are dimensioned to hold respectively the smaller and larger quantities of stubs.

24. Stub feeding apparatus as claimed in claim 23 wherein the detection means is arranged so that the feeding of stubs into a guide conduit is stopped when passage of light to the second photo-electric cell from its associated light source is interrupted by a stationary stub therebetween and the feeding of stubs into a guide conduit is started when passage of light to the first photo-electric cell from its associated light source is not interrupted by a stationary stub therebetween.

References Cited in the file of this patent

UNITED STATES PATENTS

| | | |
|---|---|---|
| 2,801,884 | Friedman | Aug. 6, 1957 |
| 2,818,964 | Picard | Jan. 7, 1958 |
| 2,934,378 | Gilbert | Apr. 26, 1960 |
| 2,988,402 | Policansky | June 13, 1961 |
| 2,993,737 | Stephens | July 25, 1961 |